United States Patent
Fisher et al.

(10) Patent No.: US 6,354,331 B1
(45) Date of Patent: Mar. 12, 2002

(54) FLEXIBLE PLASTIC TUBING CONSTRUCTION HAVING A SIGHT GLASS WINDOW

(75) Inventors: William C. Fisher, Cuyahoga Falls; Paul C. Menmuir, Richfield, both of OH (US)

(73) Assignee: Parker-Hannifin Corp., Cleveland, OH (US)

( * ) Notice: Subject to any disclaimer, the term of this patent is extended or adjusted under 35 U.S.C. 154(b) by 0 days.

(21) Appl. No.: 09/592,445

(22) Filed: Jun. 12, 2000

Related U.S. Application Data
(60) Provisional application No. 60/163,961, filed on Nov. 8, 1999.

(51) Int. Cl.[7] .............................................. F16L 55/00
(52) U.S. Cl. ........................ 138/104; 138/177; 138/140
(58) Field of Search ................................ 138/104, 103, 138/177, 178, 137, 140

(56) References Cited

U.S. PATENT DOCUMENTS

| | | | |
|---|---|---|---|
| 3,070,132 A | 12/1962 | Sheridan | 138/118 |
| 3,561,493 A | 2/1971 | Mallard | 138/141 |
| 3,605,750 A | 9/1971 | Sheridan et al. | 600/435 |
| 3,752,617 A | 8/1973 | Burlis et al. | 425/131.1 |
| 3,825,036 A | 7/1974 | Stent | 138/174 |
| 3,907,955 A | 9/1975 | Viennot | 264/105 |
| 4,276,250 A | 6/1981 | Satchell et al. | 264/167 |
| 4,330,497 A | 5/1982 | Agdanowski | 264/150 |
| 4,662,404 A | 5/1987 | Le Veen et al. | 138/120 |
| 4,691,896 A | 9/1987 | Reeve et al. | 254/134.4 |
| 4,796,970 A | 1/1989 | Reeve et al. | 385/109 |
| 4,850,569 A | 7/1989 | Griffioen et al. | 254/134.4 |
| 4,888,146 A | 12/1989 | Dandeneau | 264/173.16 |
| 4,990,033 A | 2/1991 | Handley et al. | 406/82 |
| 5,022,634 A | 6/1991 | Koeble | 254/134.4 |
| 5,065,928 A | 11/1991 | Davey et al. | 226/7 |
| 5,076,329 A | 12/1991 | Brunnhofer | 138/137 |
| 5,258,160 A | 11/1993 | Utsumi et al. | 264/558 |
| 5,284,184 A | 2/1994 | Noone et al. | 138/121 |
| 5,383,087 A | 1/1995 | Noone et al. | 361/215 |
| 5,415,203 A | * 5/1995 | Huang | 138/104 |
| 5,419,374 A | 5/1995 | Nawrot et al. | 138/137 |
| 5,456,674 A | 10/1995 | Bos et al. | 604/526 |
| 5,460,771 A | 10/1995 | Mitchell et al. | 264/508 |
| 5,469,892 A | 11/1995 | Noone et al. | 138/121 |
| 5,499,797 A | 3/1996 | Sano et al. | 254/134.4 |

(List continued on next page.)

FOREIGN PATENT DOCUMENTS

| | | |
|---|---|---|
| EP | 0 385 730 | 9/1990 |
| EP | 0 385 731 | 9/1990 |
| EP | 0 829 340 | 3/1998 |
| JP | 3042225 | 2/1991 |
| JP | 3042226 | 2/1991 |
| JP | 6201923 | 7/1994 |
| JP | 8331725 | 12/1996 |

OTHER PUBLICATIONS

Carlon Optic–Gard Data/Specification Sheet.

*Primary Examiner*—Patrick Brinson
(74) *Attorney, Agent, or Firm*—John A. Molnar, Jr.

(57) ABSTRACT

Flexible plastic tubing construction adapted for receiving a contents such as multi-fiber optical cables used in air blown fiber (ABF) installations. The tubing is formed as having a first sidewall segment formed of a first polymeric material which is generally opaque, and a second sidewall segment formed integrally with the first sidewall segment of a second polymeric material which is generally transparent. The second sidewall segment has an axial inner surface which defines at least a portion of the innermost surface of the tubing, and an axial outer surface which defines a portion of the outermost surface of the tubing. The inner and outer surfaces further define a window therebetween through the thickness dimension of the tubing sidewall, with the contents of the tubing being viewable through the window.

18 Claims, 3 Drawing Sheets

U.S. PATENT DOCUMENTS

| | | |
|---|---|---|
| 5,533,985 A | 7/1996 | Wang .......................... 604/264 |
| 5,566,720 A | 10/1996 | Cheney et al. ............... 138/137 |
| 5,622,210 A | 4/1997 | Crisman et al. ............. 138/104 |
| 5,664,763 A | 9/1997 | Sano et al. ............... 285/134.4 |
| 5,678,611 A | 10/1997 | Noone et al. ............... 138/137 |
| 5,743,304 A | 4/1998 | Mitchell et al. ............. 138/137 |
| 5,781,678 A | 7/1998 | Sano et al. .................... 138/45 |
| 5,865,218 A | 2/1999 | Noone et al. ............... 138/137 |
| 6,024,387 A | 2/2000 | Griffioen et al. ............... 285/14 |
| 6,036,682 A | 3/2000 | Lange et al. ................. 604/529 |

* cited by examiner

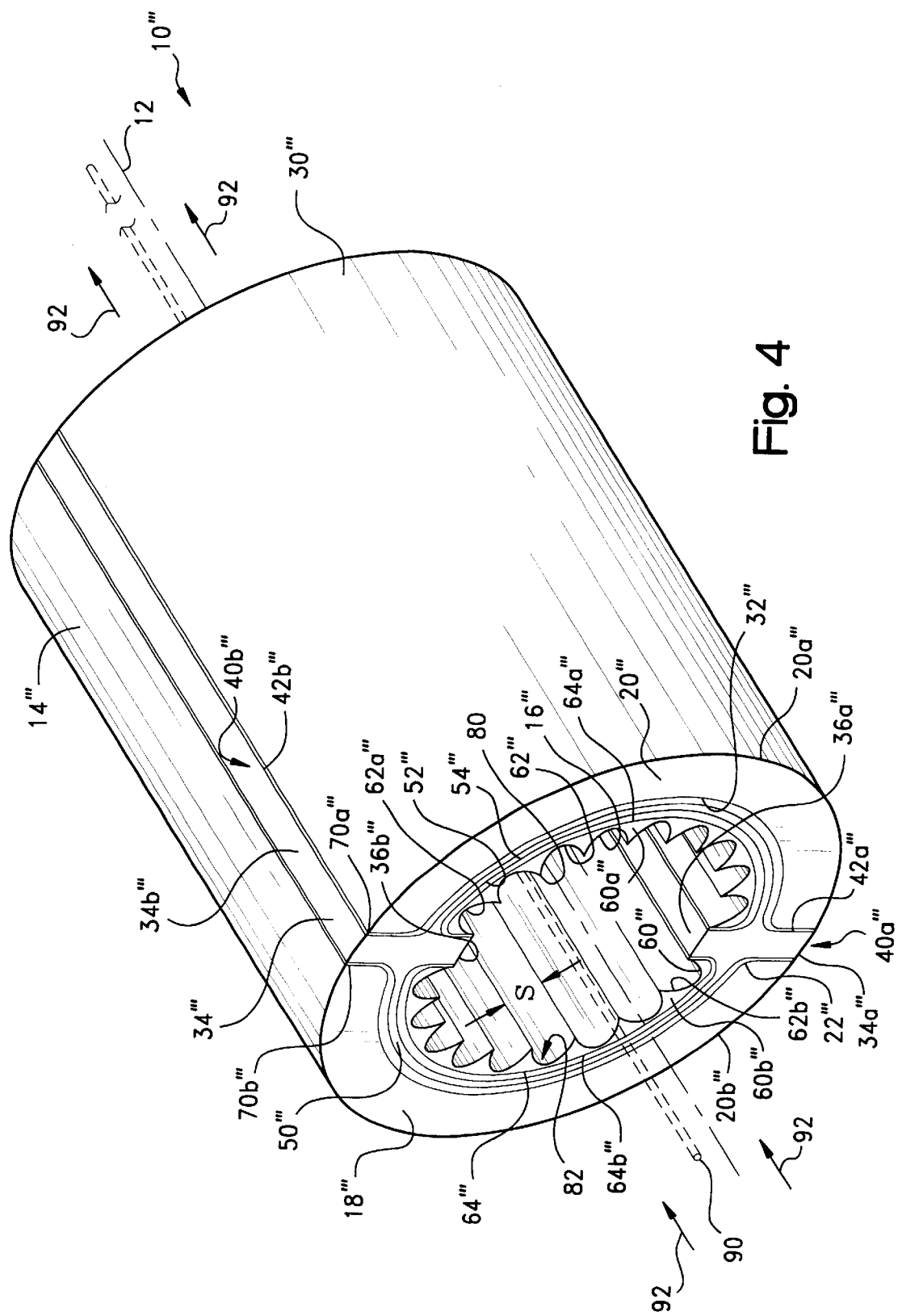

FLEXIBLE PLASTIC TUBING CONSTRUCTION HAVING A SIGHT GLASS WINDOW

CROSS-REFERENCE TO RELATED APPLICATIONS

This application claims priority of U.S. Provisional Application Ser. No. 60/163,961, filed Nov. 8, 1999.

BACKGROUND OF THE INVENTION

The present invention relates broadly to flexible plastic, i.e., polymeric, tubing constructions, and more particularly to a multi-layer or other composite tubing construction which is provided as having, for example, one or more longitudinal bands of a generally transparent material formed into an otherwise generally opaque sidewall of the tubing so as to provide for a sight glass window through which the contents of the tubing may be viewed.

Flexible plastic tubing of the type herein involved is used in a variety of fluid transfer applications as shown in U.S. Pat. Nos. 3,070,132; 3,561,493; 3,605,750; 3,752,617; 3,825,036; 3,907,955; 4,276,250; 4,330,497; 4,662,404; 4,888,146; 5,258,160; 5,456,674; 5,533,985; 6,036,682; in European Pat. Nos. 385,730; 385,732; 829,340; and in Japanese Patent Nos. 304225 and 304226. In certain applications, it is necessary to view inside the tubing for monitoring or inspection purposes, or otherwise for confirming the contents of the tubing. For these applications, it therefore is required that the tubing sidewall be generally transparent.

In these same applications, however, it also may be required that the tubing exhibits additional capabilities such as flame retardancy or other environmental resistance. Generally, these additional capabilities are achieved via the introduction of additives which are loaded at a result effective level into the base polymer system. As a result of such loading, a normally clear or transparent polymer, such as an acrylic, nylon, polyvinyl chloride (PVC), polyolefin, polyethylene terephthalate (PET), thermoplastic rubber (TPR), polybutylene terephthalate (PBT), ethylene vinyl acetate (EVA), polycarbonate, polyvinylidene fluoride (PVDF), polyamide, polymethylmethacrylate (PMMA), or liquid crystal polymer (LCP) may be rendered opaque.

One such application which has been identified by the present inventors as requiring both transparency and fire resistance involves the use of tubing in the installation of telecommunication and other networks. In what are known as "air blown fiber" (ABF) installations, a compressed gas such as dry air or nitrogen is used "blow" small, lightweight multi-fiber optical cables into flexible plastic tubing or multi-tube bundles thereof which have been previously installed along the network routing. The optical cable itself typically comprises a plastic outer sheath surrounding one or more optical fibers. The cable is advanced along the routing of the tubes by the fluid drag of the gas flowing in the tubing. ABF installations are further described in U.S. Pat. Nos. 6,024,387; 5,781,678; 5,664,763; 5,499,797; 5,065,928; 5,022,634; 4,990,033; 4,850,569; 4,796,970; 4,691,896; and in Japanese Pat. Nos. 8331725 and 6201923. Commercial ABF systems are marketed under the name FutureFlex® by Sumitomo Electric Lightwave Corp., Research Triangle Park, NC.

Conventional tubing used in ABF applications is believed not to be transparent, however, as would afford an ability to view the optical cables within the tubing to facilitate installation, servicing, or administration. In this regard, building codes and other regulations typically specify at least some degree or fire resistance for the tubing which heretofore has necessitated the use of opaque materials of construction.

As has been seen, circumstances sometimes dictate that the flexible plastic tubing herein involved must meet seemingly incompatible requirements such as transparency and flame resistance. Accordingly, it is believed that tubing constructions offering a capability for the provision of such features would be well-received, for example, by the ABF market.

BROAD STATEMENT OF THE INVENTION

The present invention is directed to flexible plastic, i.e., polymeric, tubing constructions, and particularly to a multi-layer or other composite construction which is provided as having, for example, one or more longitudinal bands of a generally transparent material formed into an otherwise generally opaque sidewall of the tubing so as to provide for a sight glass window capability through which the contents of the tubing may be viewed. Accordingly, the tubing construction of the invention herein involved is particularly adapted for use in ABF applications and other cable or wire installations wherein the ability to view the cables or wires within the tubing is desired for installation, servicing, or administration.

Advantageously, in allowing for a major portion of the tubing sidewall to be opaque with a minor portion thereof being transparent, the tubing construction of the present invention is able to provide a sight glass capability without compromising flame resistance or other chemical or physical properties. In this regard, the majority of the tubing may be formed of a base polymer which is loaded with one or more opacifying fillers to be rendered fire resistant or otherwise to exhibit other enhanced chemical or physical properties, with the remainder of the tubing being formed of the unfilled base polymer which remains transparent. From known theory, it may be predicted that the addition of less than a critical amount of unfilled polymer to the filled system would not appreciably affect the fire resistance of the system.

In accordance with the precepts of the present invention, the tubing is formed as having a first sidewall segment formed of a first polymeric material which is generally opaque, and a second sidewall segment which is co-extruded or otherwise formed integrally with the first sidewall segment of a second polymeric material which is generally transparent. The second sidewall segment has an axial inner surface which defines at least a portion of the innermost surface of the tubing, and an axial outer surface which defines a portion of the outermost surface of the tubing. The inner and outer surfaces further define a window therebetween through the thickness dimension of the tubing sidewall, with the contents of the tubing being viewable through the window.

In an illustrative embodiment, the second sidewall segment is formed as first and second longitudinal bands with the first sidewall segment extending radially therebetween. Each of the bands may be provided to extend substantially continuously along the length of the tubing, with the first longitudinal band being disposed at a first radial position relative to the circumferential extent of the tubing. The second longitudinal band, in turn, may be disposed at a second radial position opposite the first radial position so as to allow for the backlighting of the tubing during inspection.

In another illustrative embodiment, the tubing includes a third sidewall segment formed integrally with the first and second segments as having inner surface which defines a portion of tubing innermost surface. Such inner surface may be profiled as defining a series of radially-disposed longitudinal splines, ribs, or other projections. With respect to ABF installations, such projections have been observed to reduce surface area contact between the cable and tubing sidewall which results in correspondingly decreased friction as the cable is blown through the tubing. Such projections also develop a lower velocity boundary layer in the gas flow near the sidewall surface which has the tendency to direct the fiber into the higher velocity flow towards the center of the tubing. The end result is less drag on the tubing which facilitates long runs and directional changes such as around bends.

The present invention, accordingly, comprises the construction, combination of elements, and arrangement of parts of which are exemplified in the detailed disclosure to follow. Advantages of the present invention include a flexible plastic tubing construction which is provided as having a sight-glass capability without affecting the gross fire resistance, electrical conductivity, or other specified chemical or physical properties of the tubing. Additional advantages include a tubing construction which is economical to manufacture in long, continuous lengths, and which further is particularly adapted for use in ABF installations. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 4 is a perspective and radial section view of another multi-layer embodiment of the flexible plastic tubing construction of the present invention further including a profiled inner surface.

DETAILED DESCRIPTION OF THE INVENTION

Figure 2:
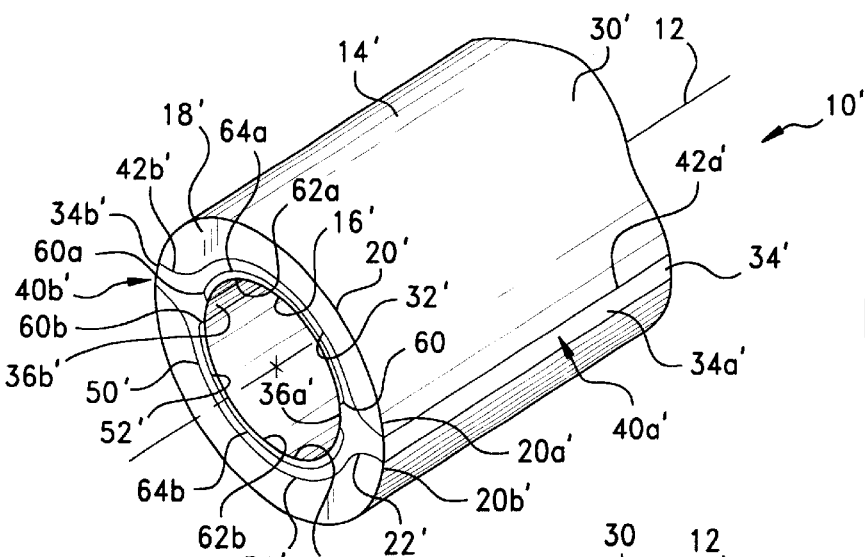
FIG. 2 is a perspective and radial section view of a representative multi-layer embodiment of the flexible plastic tubing construction of the present invention.

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions and surfaces perpendicular and parallel to the longitudinal central axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For illustrative purposes, the precepts of the tubing of the invention herein involved are described in connection with its adaptation for use within ABF installations. In view of the discourse to follow, however, it will be appreciated that aspects of the present invention may find utility in other wire or cable installations such as for signal traces, or in hydraulic or pneumatic fluid transfer, signaling, or control applications. Use within those such other applications therefore should be considered to be expressly within the scope of the present invention.

Figure 1:
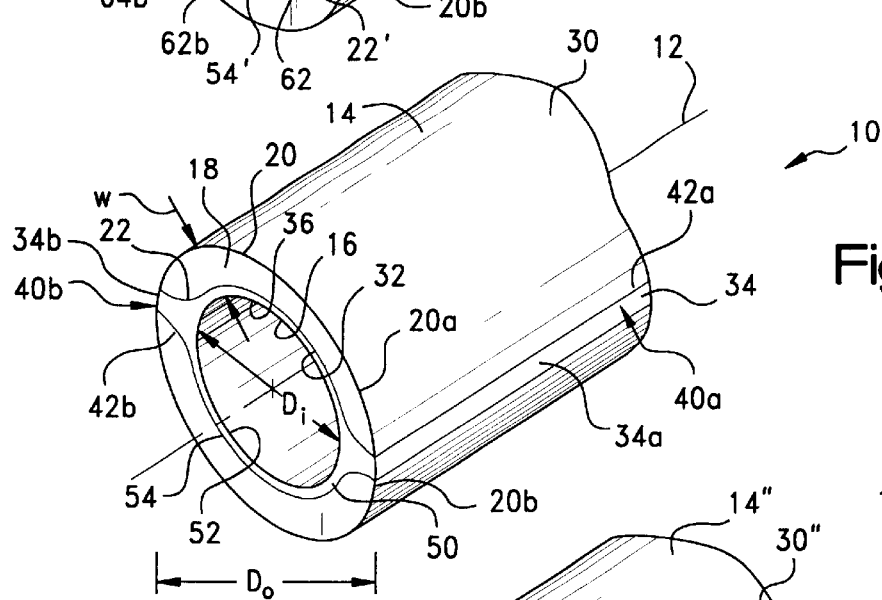
FIG. 1 is a perspective and radial section view of a representative embodiment of a length of flexible plastic tubing constructed in accordance with the present invention has having a sight-glass capability provided as a pair of longitudinal bands defined through the tubing sidewall.

Referring then to the figures wherein corresponding reference numbers are used to designate corresponding elements throughout the several views, a representative tubing construction according to the present invention is shown generally at 10 in the perspective and radial section view of FIG. 1. As may be seen, tubing 10 extends in an axial direction along a central longitudinal axis, 12, to an indefinite length, and in a radial direction circumferentially about axis 12 in defining an axial outermost surface, 14, and an axial innermost surface, 16. Together, the inner and outermost surface 14 and 16 define a sidewall, 18, of a given thickness dimension, referenced at "w," therebetween. In other basic dimensions, tubing 10 has a select inner and outer diameter referenced, respectively, at "$D_i$" and "$D_o$," which diameters may vary depending upon the application involved. For most applications, however, inner diameter $D_i$ will be between about 0.062–2.00 inch (0.158–5.08 cm), with outer diameter $D_o$ being between about 0.100–2.50 inch (0.254–5.45 cm) to define the sidewall thickness w as being between about 0.019–0.250 inch (0.048–0.635 cm).

Tubing sidewall 18 is formed as having a first sidewall segment, 20, which is extruded or otherwise formed of a first polymeric material which is generally opaque, and a second sidewall segment, 22, which is co-extruded or otherwise formed integrally with the first sidewall segment 20 of a second polymeric material which is generally transparent. As used herein, "segment" may indicate a unitary member or a plurality of corresponding member parts as will be understood from context in which reference is made. In the embodiment of FIG. 1, the first sidewall segment 20 comprises a major portion, either by weight, volume, or surface area, of the tubing sidewall, with the second sidewall segment 22 comprising the balance thereof.

First sidewall segment 20 has an axial first outer surface, 30, which defines a portion of the tubing outermost surface, 14, and an axial first inner surface, 32. Second sidewall segment 22, in turn, has an axial second outer surface, 34, which defines a portion of the tubing outermost surface, 14, and an axial second inner surface, 36, which defines at least a portion of the tubing innermost surface 16. As is shown, the first outer surface 30 of the first segment 20 and the second outer surface 36 of the second segment 22 may be provided to be generally contiguous such that tubing outermost surface 14 retains a generally cylindrical geometry.

In accordance with the precepts of the present invention, the second segment outer and inner surfaces 34 and 36 define one or more sight glass windows, referenced at 40*a–b*, therebetween through the thickness dimension w of the tubing sidewall 18. As is to be described hereinafter, with at least two or with multiple windows 40, the contents of the tubing may be viewed under either direct or backlight illumination.

With respect to the embodiment 10 of FIG. 1, each of the windows 40*a–b* is configured as a relatively narrow longitudinal band or stripe, 42*a–b*, defined between a corresponding outer surface 34*a–b* and the inner surface 36, with the first side wall segment 20 extending in bifurcated parts, 20*a–b*, radially therebetween. Preferably, the bands 42*a–b* are aligned in general parallel registration, with the first band 42*a* being disposed at a first radial position relative to the circumferential extent of the tubing 10, and the second band 42*b* being disposed at a second radial position which is 180° opposite the first radial position of the first band 42*a*. In this way, illumination provided on either side of the tubing 10 may be transmitted through the window 40 on the opposite side of the tubing. Bands 42 may extend linearly as is shown or, alternatively, may extend sinusoidally or helically along longitudinal axis 12. Moreover, and depending upon the application, bands 42 may extend either continuously or discontinuously along axis 12.

In the embodiment 10 of FIG. 1, the second sidewall segment 22 further is extruded or otherwise formed as additionally defining a generally tubular section, 50, which interconnects the longitudinal bands 42*a–b*. In this regard, section 50 extends radially about axis 12 as relatively thin inner layer which may have a thickness of between about 1–40 mils (0.02–1.02 mm). So formed, section 50 has a cylindrical inner surface, 52, which in the embodiment 10 defines the entirety of the tubing innermost surface 16, and an outer surface, 54. The inner surface 32 of first sidewall segments 20*a–b* may be fusion or otherwise bonded to the section 50 outer surface 54 to thereby form an integral tube wall 18. Advantageously, the inner surface 52 of section 50 provides tubing 10 with a homogeneous innermost surface 16 which reduces localized variations which otherwise could increase the drag on the tube contents such as during ABF installations.

As mentioned, first sidewall segment 20 is formed of a first polymeric material which is generally opaque, with second sidewall segment 22 being formed of a second polymeric material which is generally transparent. In this regard, the first polymeric material may be formulated as comprising a base polymer which is normally transparent, but which is compounded to meet the requirements of the application involved with a filler or other additive loaded at a level rendering the base polymer generally opaque. As used herein, "opaque" should be understood to be used interchangeably with "translucent" or other otherwise as transmitting light but causing sufficient diffusion to prevent perception of distinct images. The fillers and additives, which may be in liquid, powder, particulate, flake, fiber, or other form, may include electrically-conductive fillers, pigments, microwave-attenuating fillers, thermally-conductive fillers, lubricants, wetting agents, stabilizers, antioxidants, pigments, coloring or opacifying agents, luminescents, light reflectants, chain extending oils, tackifiers, blowing agents, foaming or anti-foaming agents, and particularly fire retardants such as halogenated compounds, metal oxides and salts, intercalated graphite particles, borates, siloxanes, phosphates, glass, hollow or solid glass or elastomeric microspheres, silica, silicates, mica, and the like. Typically, the fillers and additives are blended or otherwise admixed with the base polymer, and may comprise between about 0.3–80% or more by total volume of the formulation.

It is to be understood that, if so desired, each of the bifurcate first wall segment parts 20*a–b* may be formulated of different materials or with different fillers or additives to exhibit different properties. For example, one of the parts 20*a–b* may include an electrically-conductive filler to be rendered static dissipative. Alternatively, the parts 20*a–b* may be filler with different pigments or other colorants so as to have different colors for coding or selection purposes, or for indicating twist during installation, for example.

The second polymeric material forming the second sidewall segment 22 may be formulated of the same or a different base polymer as the first polymeric material, but otherwise as selected to be generally transparent. These base polymers may be broadly classified as "resins" and include both thermoplastic and thermosetting materials. Preferred materials include polyolefins, polyesters, fluoropolymers, polyvinyl chlorides, polyamides, nylons, poly(ether ether ketone), polyimides, polyetherimides, polybutylene and polyethylene terephthalates, polysulfones, polyacrylics, polymethylacrylates, polymethylmethacrylates, polycarbonates, poly(ester and ether urethanes), liquid crystal polymers (LCP), acetal homo and copolymers, and copolymers and blends thereof. Alternatively, the base polymer may be a natural rubber such as Hevea or a thermoplastic, i.e., melt-processible, or thermosetting, i.e., vulcanizable, synthetic rubber such as chlorosulfonate, polybutadiene, butyl, neoprene, nitrile, polyisoprene, buna-N, a copolymer rubber such as ethylene-propylene (EPR), ethylene-propylene-diene monomer (EPDM), nitrile-butadiene (NBR) and styrene-butadiene (SBR), or a blend such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides.

Although tubing 10 may be formed as in FIG. 1 as having an innermost surface 16 which is of a unitary, single-layer construction, it may be preferred depending upon the fluid or other material being handled that surface 16 be provided, as shown at 16' in FIG. 2, as having a composite or multi-layer construction. Turing then to FIG. 2, tubing 10 of the present invention reappears at 10' as further including a third sidewall segment, 60, which is formed integrally with the first and second segments 20' and 22' as an innermost barrier layer or liner. In this regard, the third sidewall segment 60 may be formed to extend radially in two parts, 60*a–b*, about axis 12 intermediate the first and second longitudinal window bands 42*a'–b'*, and as having an axial third inner surface, 62*a–b*, which defines a portion of the tubing innermost surface 16', and an axial third outer surface, 64*a–b*, which is bonded or otherwise joined to the faying inner surface 52' of tubular section 50'. Advantageously, the third segment inner surface 62 extends radially about axis 12 intermediate the inner surfaces 36*a'–b'* of bands 42 so as not to occlude the viewing windows thereof.

The third sidewall segment 60 may be formed of a third polymeric material which may be of a same or different base polymer as the first and second polymeric materials, and which may be filled or unfilled. The third polymeric material also may be filled with solid or hollow glass microspheres having a diameter of between about 0.0003–0.020 inch (0.007–0.52 mm) so as to impart a surface texture to the inner surface 62. Such surface texture is useful for ABF installations in reducing surface area contact and, resultantly, friction between the cable and tubing sidewall, and in the development of a boundary layer in the gas flow near the sidewall surface having the tendency to direct the fiber into the higher velocity flow towards the center of the tubing. The addition of glass microspheres also serves in the dissipation of static charges which further assists in the movement of the optical fiber bundles through the tubing.

For resistance to internal or external fluid permeation, and/or for providing increased lubricity or resistance to wear, the third sidewall segment 60 alternatively may be formed of a material which is chemically-resistant and/or which exhibits a relatively low coefficient of friction or other resistance to wear. Preferred materials include fluoropolymers, such as polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetraflurorethylene (ETFE) terpolymer, polyvinylidene fluoride (PVDF), polyvinylfluoride (PVF), polyolefins, ethylene vinyl acetate (EVA), thermoplastic rubbers, and polyethylene and polybutylene terephthalates, and copolymers and blends thereof. These materials also may be reinforced with glass, carbon, or textile fibers or other fillers for increased abrasion resistance. For cost considerations, the wall thickness of the third segment 60 may be maintained at the minimum necessary to provide the desired chemical or physical property, and for most applications will be between about 0.004–0.102 inch (0.100–2.60 mm).

The sidewall segments 20, 22, and 60 forming tubing 10 and 10' preferably are fabricated by extrusion, co-extrusion, or sequential extrusion which allows for the economical production of long, continuous lengths, but alternatively may be formed by coating, molding, or other known methods. With respect to extrusion fabrication, each segment or segment part, in the case of the parts being formulated of different materials or compounded with different fillers or additives, may be extruded from a separate extruder.

If formed of compatible materials, the segments may be cross-linked or otherwise chemically or fusion bonded together at their respective interfaces into an integral, tubular composite structure. If formed of chemically dissimilar or otherwise incompatible materials, however, intermediate tie or bonding layers, such as referenced at 70a and 70b in FIG. 3, may be co-extruded with the segments as being formed of a polymeric material which is adhesion bond compatible with both the materials of segments 20" and 22", in case of tie layer 70a, and segments 22" and 60", in the case of tie layer 70b. With respect to tubing 10" shown in FIG. 3, tie layer 70a bonds the inner surface 32" of first segment 20' to the outer surface 54" of the second segment section 50", with tie layer 70b bonding the inner surface 52" of segment 22" to the outer surface 64" of the third segment 60". Suitable materials for tie layers 70 include PVDF, PVF, polyvinyl acetate (PVA), urethanes, and copolymers, alloys, and blends thereof, as well as thermoplastic or thermosetting rubbers. The wall thickness of the tie layers 70 typically will be less than or about equal to the wall thicknesses the corresponding segments. The use of tie layers is further described in U.S. Pat. Nos. 3,561,493; 5,076,329; 5,167,259; 5,284,184; 5,383,087; 5,419,374; 5,460,771; 5,469,892; 5,566,720; 5,622,210; 5,678,611; 5,743,304; and 5,865,219.

Figure 3:
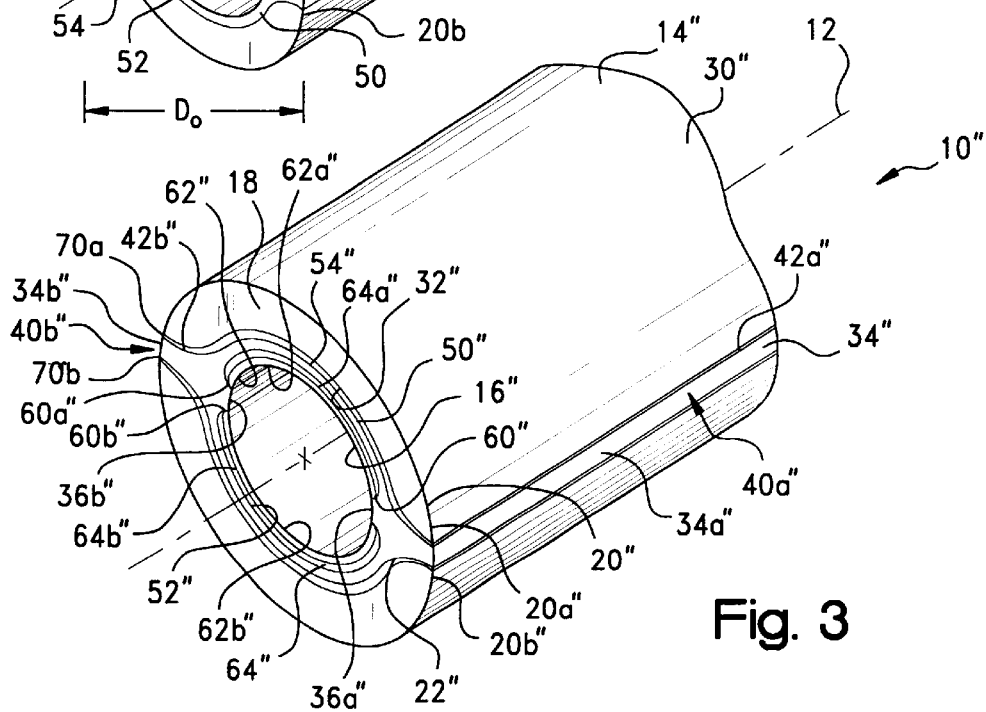
FIG. 3 is a perspective and radial section view of another representative multi-layer embodiment of the flexible plastic tubing construction of the present invention.
Figure 5A:
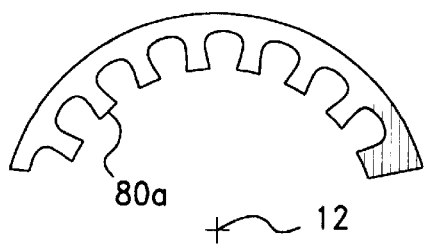
FIGS. 5a–f are fragmentary radial section views of alternative surface profiles for the tubing construction of FIG. 4.
Figure 5B:
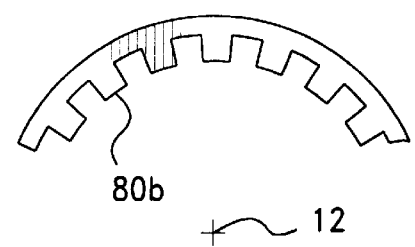
Figure 5C:
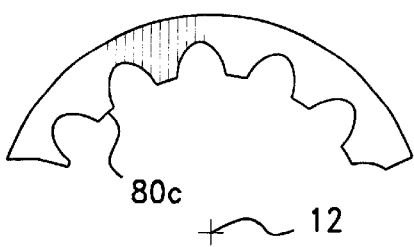
Figure 5D:
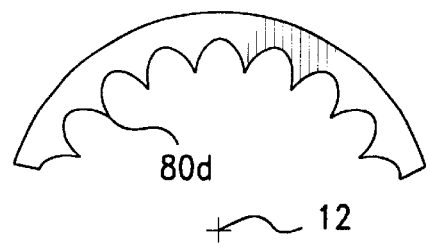
Figure 5E:
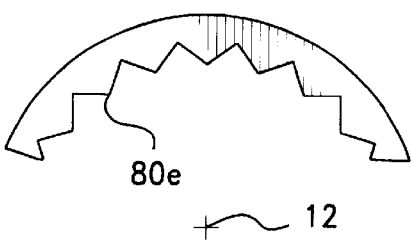
Figure 5F:
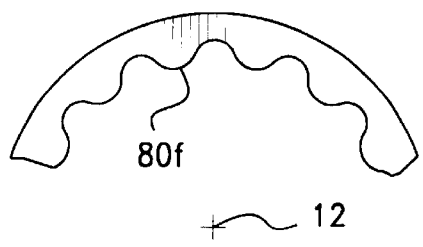

Referring next to FIG. 4, tubing 10" of FIG. 3 reappears at 10'" wherein the inner surface, 62a""–b'", of each third sidewall segment 60a–b, now referenced at 60a'" and 60b'", is extruded, molded, or otherwise formed as having a series of longitudinal, generally parallel ridges, splines, ribs, or other projections, one of which is referenced at 80. The projections 80 are disposed radially about axis 12, and may extend discontinuously or, as is shown in FIG. 4, generally continuously along the entirety of the length of the tubing 10'". For ABF applications, it is preferred that the radial spacing, referenced at "s," between each of the projections 80 be sized to be less than the diameter of the optical cables, one of which is shown in phantom at 90, so as to prevent the cables from becoming lodged within the troughs, one of which is referenced at 82, defined between adjacent pairs of the projections. As is shown in FIGS. 5a–f, the projections 80, referenced respectively at 80a–f in those figures, may be formed by any number of different surface profiles.

As mentioned, projections 80 have been observed to reduce surface area contact between the cable and tubing sidewall which results in correspondingly decreased friction as the cable is blown through the tubing. Such projections also develop a lower velocity boundary layer in the gas flow, the direction of which is indicated by arrows 92, near the sidewall surface which has the tendency to direct the fiber into the higher velocity flow towards the center of the tubing. The end result is less drag on the tubing which facilitates long runs and directional changes such as around bends.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. Flexible plastic tubing adapted for receiving a contents, said tubing extending in an axial direction along a central longitudinal axis to an indefinite length, and in a radial direction circumferentially about said longitudinal axis, said tubing having an axial outermost surface and an axial innermost surface which together define a sidewall of a given thickness dimension therebetween, said tubing comprising:

a first sidewall segment formed of a first polymeric material which is generally opaque, and having an axial first outer surface which defines a portion of the tubing outermost surface, and an axial first inner surface; and a second sidewall segment formed as a longitudinal band integrally with said first sidewall segment of a second polymeric material which is generally transparent, and having an axial second inner surface which defines at least a portion of the tubing innermost surface, and an axial second outer surface which defines a portion of the tubing outermost surface, said second inner and said second outer surface defining a window therebetween through the thickness dimension of the tubing sidewall, the contents of said tubing being viewable through said window.

2. The flexible plastic tubing of claim 1 wherein the first outer surface of said first sidewall segment and the second outer surface of said second sidewall segment are generally contiguous.

3. The flexible plastic tubing of claim 1 wherein said first sidewall segment forms a major portion of the tubing sidewall, and said second side wall segment forms a minor portion of the tubing sidewall.

4. The flexible plastic tubing of claim 1 wherein said first polymeric material comprises a first resin component and a filler which renders said first polymeric material generally opaque, and wherein said second polymeric material comprises a second resin component.

5. The flexible plastic tubing of claim 4 wherein said first and said second resin component are the same.

6. The flexible plastic tubing of claim 1 wherein said longitudinal band extends substantially continuously along the length of said tubing.

7. Flexible plastic tubing adapted for receiving a contents, said tubing extending in an axial direction along a central longitudinal axis to an indefinite length, and in a radial direction circumferentially about said longitudinal axis, said tubing having an axial outermost surface and an axial innermost surface which together define a sidewall of a given thickness dimension therebetween, said tubing comprising:

a first sidewall segment formed of a first polymeric material which is generally opaque, and having an axial first outer surface which defines a portion of the tubing outermost surface, and an axial first inner surface; and a second sidewall segment formed integrally with said first sidewall segment of a second polymeric material which is generally transparent, and having an axial second inner surface which defines at least a portion of the tubing innermost surface, and an axial second outer surface which defines a portion of the tubing outermost surface, said second inner and said second outer surface defining a window therebetween through the thickness dimension of the tubing sidewall, the contents of said tubing being viewable through said window;

said second sidewall segment being formed as comprising first and second longitudinal bands with said first sidewall segment extending in a first and a second part radially therebetween, the first longitudinal band being disposed at a first radial position relative to the circumferential extent of said tubing, and the second longitudinal band being disposed at a second radial position opposite said first radial position.

8. The flexible plastic tubing of claim 7 wherein each of said bands extends substantially continuously along the length of said tubing.

9. The flexible plastic tubing of claim 7 further comprising a third sidewall segment formed integrally with said first and said second sidewall segment of a third polymeric material, said third sidewall segment extending radially about said longitudinal axis intermediate said first and said second longitudinal bands, and having an axial third inner surface which defines a portion of tubing innermost surface, and an axial third outer surface.

10. The flexible plastic tubing of claim 9 wherein said second sidewall segment is further formed as comprising a generally tubular section which interconnects said first and second longitudinal bands, said third outer surface of said third sidewall segment being bonded to said tubular section.

11. The flexible plastic tubing of claim 10 wherein said second and said third polymeric material are incompatible and further comprising a tie layer interposed between the third outer surface of said third sidewall segment and the tubular section of second sidewall segment, said tie layer being formed of a fourth polymeric material mutually compatible with said second and said third polymeric material and bonding said third sidewall segment to said tubular section.

12. The flexible plastic tubing of claim 10 wherein said first inner surface of said first sidewall member is bonded to said tubular section of said second sidewall segment opposite said third sidewall segment.

13. The flexible plastic tubing of claim 9 wherein the third outer surface of said third sidewall segment is textured.

14. The flexible plastic tubing of claim 9 wherein the third inner surface of said third sidewall segment is formed as defining a series longitudinal projections disposed radially about said longitudinal axis.

15. The flexible plastic tubing of claim 7 wherein said second sidewall segment is further formed as comprising a generally tubular section which interconnects said first and second longitudinal bands, said first inner surface of said first sidewall segment being bonded to said tubular section of said second sidewall segment.

16. The flexible plastic tubing of claim 15 wherein said first and said second polymeric material are incompatible and further comprising a tie layer interposed between the first inner surface of said first sidewall segment and the tubular section of second sidewall segment, said tie layer being formed of a third polymeric material mutually compatible with said first and said second polymeric material and bonding said first sidewall segment to said tubular section.

17. The flexible plastic tubing of claim 7 wherein said first polymeric material comprises one or more resin components and one or more fillers, said first sidewall segment first part being formed of a first combination of said resin components and said fillers, and said first sidewall segment second part being formed of a second combination of said resin components and said fillers different from said first combination.

18. Flexible plastic tubing adapted for receiving a contents, said tubing extending in an axial direction along a central longitudinal axis to an indefinite length, and in a radial direction circumferentially about said longitudinal axis, said tubing having an axial outermost surface and an axial innermost surface which together define a sidewall of a given thickness dimension therebetween, said tubing comprising:

a first sidewall segment formed of a first polymeric material which is generally opaque, and having an axial first outer surface which defines a portion of the tubing outermost surface, and an axial first inner surface; and a second sidewall segment formed integrally with said first sidewall segment of a second polymeric material which is generally transparent, and having an axial second inner surface which is generally annular and which defines the entirety of the tubing innermost surface, and an axial second outer surface which defines a portion of the tubing outermost surface, said second inner and said second outer surface defining a window therebetween through the thickness dimension of the tubing sidewall, the contents of said tubing being viewable through said window.

* * * * *